(12) United States Patent
Lukac

(10) Patent No.: US 8,351,696 B2
(45) Date of Patent: Jan. 8, 2013

(54) CORRECTING DEFECTIVE PIXELS IN DIGITAL COLOR IMAGES

(75) Inventor: Rastislav Lukac, San Jose, CA (US)

(73) Assignee: Foveon, Inc., Santa Clara, CA (US)

( * ) Notice: Subject to any disclaimer, the term of this patent is extended or adjusted under 35 U.S.C. 154(b) by 269 days.

(21) Appl. No.: 12/961,284

(22) Filed: Dec. 6, 2010

(65) Prior Publication Data

US 2012/0070081 A1  Mar. 22, 2012

Related U.S. Application Data

(60) Provisional application No. 61/384,110, filed on Sep. 17, 2010, provisional application No. 61/384,693, filed on Sep. 20, 2010.

(51) Int. Cl.
*G06K 9/00* (2006.01)
*H04N 9/64* (2006.01)

(52) U.S. Cl. ............ 382/167; 382/162; 348/246

(58) Field of Classification Search .......... None
See application file for complete search history.

(56) References Cited

U.S. PATENT DOCUMENTS

| | | | |
|---|---|---|---|
| 5,875,040 A * | 2/1999 | Matraszek et al. | 358/453 |
| 6,487,321 B1 * | 11/2002 | Edgar et al. | 382/260 |
| 7,460,688 B2 * | 12/2008 | Stanback et al. | 382/103 |
| 8,089,537 B2 * | 1/2012 | Hoshuyama et al. | 348/246 |
| 8,111,307 B2 * | 2/2012 | Deever et al. | 348/246 |
| 2010/0026862 A1 * | 2/2010 | Nishiwaki | 348/246 |

FOREIGN PATENT DOCUMENTS

EP   2026563 A1 *   2/2009

OTHER PUBLICATIONS

R. Lukac and K. N. Plataniotis, "Single-sensor camera image processing," in Color Image Processing: Methods and Applications, chapter 16, pp. 363-392, CRC Press, 2007.*

* cited by examiner

*Primary Examiner* — Li Liu
(74) *Attorney, Agent, or Firm* — Lewis and Roca LLP

(57) ABSTRACT

A method for replacing defective pixels in a digital color image includes determining whether each pixel has defective data in a selected color channel; for the pixel, determining whether a first reference color channel exists and, if so, correcting the defective data by defining a group of neighboring pixels; for each of m neighboring pixels having non-defective data in the selected color channel and the reference color channel, computing a sum of the differences between the non-defective data in the selected color channel and the non-defective data in the first reference color channel; adding the sum of the differences divided by m to the non-defective data value from the first reference color channel to obtain a result; dividing the result by two to obtain a substitution data value; and substituting the substitution data value for the defective data.

18 Claims, 7 Drawing Sheets

| R1 | R2 | R3 |
|----|----|----|
| R4 | R5 | R6 |
| R7 | R8 | R9 |

FIGURE 1
(PRIOR ART)

| R1 | R2 | R3 |
|----|----|----|
| R4 | R5 | R6 |
| R7 | R8 | R9 |

| G1 | G2 | G3 |
|----|----|----|
| G4 | G5 | G6 |
| G7 | G8 | G9 |

| B1 | B2 | B3 |
|----|----|----|
| B4 | B5 | B6 |
| B7 | B8 | B9 |

FIGURE 2

CORRECTING DEFECTIVE PIXELS IN DIGITAL COLOR IMAGES

CROSS-REFERENCE TO RELATED APPLICATIONS

This application claims the benefit of U.S. Provisional Patent Application Ser. No. 61/384,110, filed Sep. 17, 2010, and the benefit of U.S. Provisional Patent Application Ser. No. 61/384,693, filed Sep. 20, 2010, the entirety of both of which are incorporated herein.

BACKGROUND

1. Field of the Invention

The present invention relates to correction of defective pixels in digital images. More particularly, the present invention relates to methods for performing fast pixel correction in digital color images.

2. The Prior Art

There are numerous methods known in the prior art for replacing defective pixels in digital images. For example, in cameras employing the F13 sensor or its predecessors manufactured by Foveon, Inc., defective pixels are corrected using a defective pixel map or list generated during sensor calibration. In this step defective pixels are replaced with average values of the neighboring pixels that are not defective.

According to this prior-art method, defective pixels have been identified and are entered into a defective pixel map or list. All three color channels of each identified defective pixel get replaced by the average of a specified set of neighbors. An example of this algorithm can be seen from an examination of FIG. 1. In this figure, a 3×3 pixel neighborhood of a single color channel (e.g., red) is shown, with nine pixels in this neighborhood labeled as R1 to R9. For purposes of this example, it is assumed that pixels R1 and R5 are defective, as indicated by the "X" designations in the lower right-hand corners of those pixels. For correction of each pixel, a 3×3 neighborhood of pixels is selected wherein the center pixel is the pixel of interest. In the example of FIG. 1, pixel R5 is of interest.

In the pixel neighborhood where pixel R5 is the center, pixels R2, R3, R4, R6, R7, R8, and R9 are good and may be used in the illustrative prior-art correction algorithm. Pixel R1 is defective and will not be used to estimate the value of defective pixel R5. According to this prior-art algorithm, the average value of the good neighboring pixels is computed and is substituted for the value of the defective pixel R5. Thus, in the example shown in FIG. 1, the substitute value for pixel R5 may be computed as:

$$R5=(R2+R3+R4+R6+R7+R8+R9)/7 \quad (1)$$

In a more general sense, image data and the defective pixel list are used as the input to the algorithm. Each defective pixel on the list may be identified by its multi-bit address and followed by an 8-bit mask (0 or 1). This mask is to identify each of the eight surrounding pixels as a good (1) or defective (0) pixel. Only the good pixels are used to determine the replacement value. This operation can be mathematically written as follows:

$$y_{(r,s)k} = \begin{cases} \frac{1}{\sum_{(i,j)\in\zeta} b_{(i,j)}} \sum_{(i,j)\in\zeta} b_{(i,j)} x_{(i,j)k} & \text{for } b_{(r,s)} = 0, \\ x_{(r,s)k} & \text{for } b_{(r,s)} = 1 \end{cases} \quad (2)$$

where k indicates the color channel, that is, k=1 for red, k=2 for green, and k=3 for blue. The triplet $y_{(r,s)}=[y_{(r,s)1}, y_{(r,s)2}, y_{(r,s)3}]^T$ denotes the corrected color pixel, wheres $x_{(i,j)}=[x_{(i,j)1},x_{(i,j)2},x_{(i,j)3}]^T$, for $(i,j)\in\zeta$, denotes the pixels from the input color image with defective pixels. Each component of these pixels represents the intensity value in the kth color channel. The term $\zeta=\{(i,j); r-1\leq i\leq r+1, s-1\leq j\leq s+1\}$ denotes a 3×3 pixel neighborhood centered in the location (r,s) of the pixel to be corrected. The need for the correction process is indicated by the defective pixel flag $b_{(r,s)}=0$. If the location (r,s) is associated with the defective pixel flag $b_{(r,s)}=1$, then the pixel under consideration is kept unchanged.

This prior-art algorithm operates directly on pixel values and processes each color channel separately, ignoring the fact that natural color images usually exhibit significant spectral correlation. Unfortunately, such componentwise processing often results in various color shifts or visible edge artifacts due to the lack of color information in the data estimation process. To avoid this drawback, a different solution is needed.

BRIEF DESCRIPTION

A defective pixel correction algorithm according to the present invention requires having at least one non-defective color component in the location under consideration to correct defective one or two other color components in the same pixel location.

According to one aspect of the present invention, the weighted sum of color differences of good neighboring pixels in the color channel containing the defective pixel and the good pixels in at least one other color channel is computed and used to provide the substitute value for the defective pixel.

According to another aspect of the present invention, the weighted sum of color differences of good neighboring pixels in the color channel containing the defective pixel and the good pixels in both of the other color channels is computed and used to provide the substitute value for the defective pixel.

According to another aspect of the present invention, a weighted sum of color ratios of good neighboring pixels in the color channel containing the defective pixel and the good pixels in at least one other color channel is computed and used to provide the substitute value for the defective pixel.

BRIEF DESCRIPTION OF THE DRAWING FIGURES

FIG. 1 is a diagram illustrating a 3×3 pixel neighborhood in a digital image, showing pixel data in a single color channel (e.g., red) and including defective pixels to illustrate one prior-art method for defective pixel correction.

FIG. 2 is a diagram illustrating a 3×3 pixel neighborhood in a digital image, showing pixel data in three colors (e.g., red, green, and blue) and including defective pixels in each color channel to illustrate methods for defective pixel correction in accordance with the present invention.

DETAILED DESCRIPTION

Figure 3:
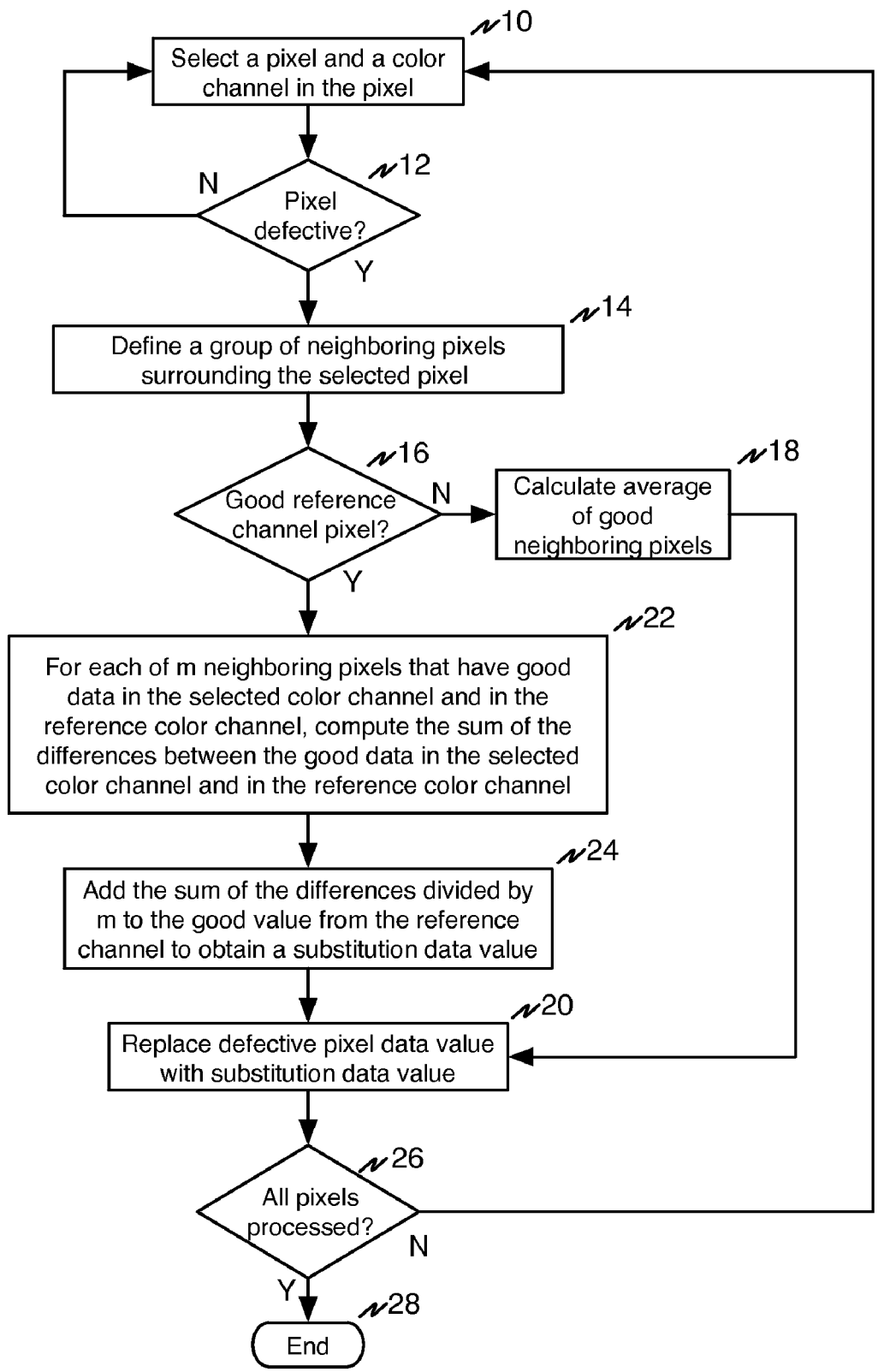
FIG. 3 is a flow diagram illustrating one exemplary method for defective pixel correction in accordance with the present invention.

Persons of ordinary skill in the art will realize that the following description of the present invention is illustrative only and not in any way limiting. Other embodiments of the invention will readily suggest themselves to such skilled persons.

Referring now to FIG. 2, a diagram depicting a 3×3 pixel neighborhood in a digital image, showing red, green, and blue pixel data and including defective pixels in each color channel can be utilized to illustrate methods for defective pixel correction in accordance with the present invention.

In FIG. 2, red channel pixels R1 and R5 are assumed to be defective; green channel pixel G3 is assumed to be defective; and blue channel pixels B3 and B8 are assumed to be defective as indicated by the "X" designations in the lower right-hand corners of those pixels. According to a first aspect of the present invention, the substitute value for pixel R5 may be computed using available pixels in the red and green channels as:

$$R5 = G5 + ((R2-G2)+(R4-G4)+(R6-G6)+(R7-G7)+ (R8-G8)+(R9-G9))/6 \quad (3)$$

Alternately, the substitute value for pixel R5 may be computed using available pixels in the red and blue channels as:

$$R5 = B5 + ((R2-B2)+(R4-B4)+(R6-B6)+(R7-B7)+(R9-B9))/5 \quad (4)$$

From an examination of the two above examples using the green and blue channels for color correction, it may be seen that, when using the green channel, there are six available terms because the red and green channels both have good pixels in positions 2, 4, 6, 7, 8, and 9 of the neighborhood. When using the blue channel, there are only five available terms because the red and blue channels both have good pixels in positions 2, 4, 6, 7, and 9 of the neighborhood.

Combining all the available information in all three color channels, the substitute value for R5 may be computed as:

$$R5 = [(G5+\Sigma(Ri-Gi)/6)+(B5+\Sigma(Rj-Bj)/5]/2, \text{for } i=2,4,6, 7,9 \text{ and } j=2,4,6,7,9 \quad (5)$$

where Σ denotes the summation operator.

In a slightly less complicated version of this algorithm, good pixel data from both the green and blue channels may be used in computing the substitute value for pixel R5 as follows:

$$R5 = [(G5+\Sigma(Ri-Gi)/5)+(B5+\Sigma(Ri-Bi)/5)]/2, \text{for } i=2,4, 6,7,9 \quad (6)$$

In its simplest form, the color-correlation driven defective pixel correction operation of the present invention can be mathematically written in general as follows:

$$y_{(r,s)k} = \begin{cases} x_{(r,s)c} + \frac{1}{\sum_{(i,j)\in\zeta} b_{(i,j)}} \sum_{(i,j)\in\zeta} b_{(i,j)}(x_{(i,j)k} - x_{(i,j)c}) & \text{for } b_{(r,s)k} = 0, \\ x_{(r,s)k} & \text{for } b_{(r,s)k} = 1 \end{cases} \quad (7)$$

where k denotes the color channel to be corrected (e.g., k=1 for red) and c denotes the non-defective reference channel (e.g., k=2 for green in this example). The term $b_{(i,j)}$ denotes the defective pixel flag set as $b_{(i,j)}=\min(b_{(i,j)k},b_{(i,j)c})$ or $b_{(i,j)}=\min(b_{(i,j)1},b_{(i,j)2},b_{(i,j)3})$ during sensor calibration. The data averaging operation is performed on color differences instead of directly on color components. Since color difference signals are low-pass in their nature, averaging color differences usually produces smaller processing error than the equivalent operation performed on pixel intensities, which is particularly true in image areas with edges and details. The high frequency content of the kth color channel is restored by adding the non-defective component $x_{(r,s)c}$ from the reference color channel to the average color difference value.

Note that if two non-defective color components are available, then the final value of corrected color components can be obtained as the combination of two $y_{(r,s)k}$ values obtained using Equation (7) for two difference values of c (e.g., c=1 and c=2 for good red and green channels used to correct blue channel, i.e., k=3).

The defective pixel correction framework according to the present invention allows combining simultaneously the spatial, spectral, and structural image characteristics. Similar to Equations (2) and (7), the spatial characteristics are considered by operating on samples inside the neighborhood ζ whereas similar to Equation (7) spectral characteristics are considered by making the use of color difference signals. Structural characteristics reflect the presence of edges and details in the image and these characteristics can be addressed in the calculations through the use of edge-sensitive weights as follows:

$$R5 = [(G5+\Sigma wi(Ri-Gi)/\Sigma wi)+(B5+\Sigma wi(Ri-Bi)/\Sigma wi)]/2, \text{for } i=2,4,6,7,9 \quad (8)$$

In general, the algorithm of Equation (8) may be generally expressed as follows:

$$y_{(r,s)k} = \quad (9)$$
$$\begin{cases} x_{(r,s)c} + \frac{1}{\sum_{(i,j)\in\zeta} b_{(i,j)}w_{(i,j)}} \sum_{(i,j)\in\zeta} b_{(i,j)}w_{(i,j)}(x_{(i,j)k} - x_{(i,j)c}) & \text{for } b_{(r,s)k} = 0, \\ x_{(r,s)k} & \text{for } b_{(r,s)k} = 1 \end{cases}$$

In a straightforward way, the weights $w_{(i,j)}$ can be estimated using any common edge detection algorithm applied to either one or two non-defective color channels. For example, in one possible implementation, the edge-sensitive weights will be fairly small if the pixels associated with these weights are too different from other pixels inside a 3×3 pixel neighborhood. Note that all solutions constructed within the presented framework can be used in a recursive mode, that is, the actual pixel can be corrected using both non-defective and previously corrected pixels located inside ζ.

A straightforward alternative to the solution in Equation (9) is to replace the addition and subtraction operations with multiplication and division, respectively. Such an alternative can be generally expressed as follows:

$$y_{(r,s)k} = \begin{cases} \dfrac{x_{(r,s)c}}{\sum_{(i,j) \in \zeta} b_{(i,j)} w_{(i,j)}} \sum_{(i,j) \in \zeta} b_{(i,j)} w_{(i,j)} \dfrac{x_{(i,j)k}}{x_{(i,j)c}} & \text{for } b_{(r,s)k} = 0, \\ x_{(r,s)k} & \text{for } b_{(r,s)k} = 1 \end{cases} \quad (10)$$

More specifically, given the example depicted in Equation (4), the substitute value of the defective pixel can be obtained using color ratios as follows:

$$R5 = B5 \times ((R2/B2)+(R4/B4)+(R4/B4)+(R6/B6)+(R7/B7)+(R9/B9))/5 \quad (11)$$

Applying this concept to any above-presented color-difference formulation is straightforward. However, it should be noted that a color-ratio based solution may be more difficult to implement than its color-difference based variant.

FIGS. 3 to 8 are flow charts that illustrate exemplary processes for replacing defective pixel data in accordance with the present invention. Persons skilled in the art will appreciate that the following examples are exemplary only and do not represent all possible methods of replacing defective pixel data in accordance with the present invention.

Referring now to FIG. 3, a flow diagram illustrates the above-described exemplary method for defective pixel correction in accordance with the present invention. First, at reference numeral 10 a pixel and the data of one of the color channels in the pixel are selected. Next, at reference numeral 12, it is determined whether the selected pixel data in the selected color channel is defective. This may be done by examining the defective pixel map or list, or by other means known in the art.

At reference numeral 14, a group of neighboring pixels surrounding the selected pixel is defined. In a presently-preferred embodiment, this neighborhood may be defined as a 3×3 group of neighboring pixels with the selected pixel in the center. Persons of ordinary skill in the art will appreciate that the pixel neighborhood could be defined in other ways using a fewer or greater number of pixels surrounding the selected pixel. Such skilled persons will also appreciate that for pixels located at the edges of an image, there will not be adjacent available pixels to one side (either top, bottom, left, or right) or in the corner of the image to even two sides (either top-left, top-right, bottom-left, or bottom right) of the selected pixel that can be used for correction. In such cases, the methods of the present invention can be implemented using the data available from the existing adjacent pixels or the edge pixels can be ignored.

At reference numeral 16 it is determined whether there is a reference color channel for the pixel containing good pixel data. For example, if the red color channel of the selected pixel is being processed, it is determined whether the data in either of the blue or green color channels is good data. If it is determined that there is no good reference channel pixel, the process proceeds to reference numeral 18, where a process, such as calculating the average value of the good pixels in the selected color channel defined neighborhood, is performed to generate substitute data for the defective pixel. The process proceeds to reference numeral 20 where the generated substitute data is used to replace the defective pixel data.

If, at reference numeral 16, it is determined that there is a reference color channel in the selected pixel having good data, the process proceeds to reference numeral 22, where data in the selected color channel and the reference color channel from all of the available neighboring pixels (i.e., only pixels with good data) is processed to compute the sum of the differences between the good data in the selected color channel and the data in the reference color channel. In general, there will be an integer m equal to the number of neighboring pixels that have good data in both the selected color channel and the reference color channel. At reference numeral 24, the sum of the differences divided by m is added to the good data value from the reference color channel of the selected pixel to obtain a data substitution value.

Next, at reference numeral 20, the defective pixel data value is replaced with the substitution data value. At reference numeral 26, it is determined whether all pixels have been processed. If all pixels have been processed, the process ends at reference numeral 28. If all pixels have not yet been processed, the process returns to reference numeral 10, where another pixel is selected for review.

Figure 4:
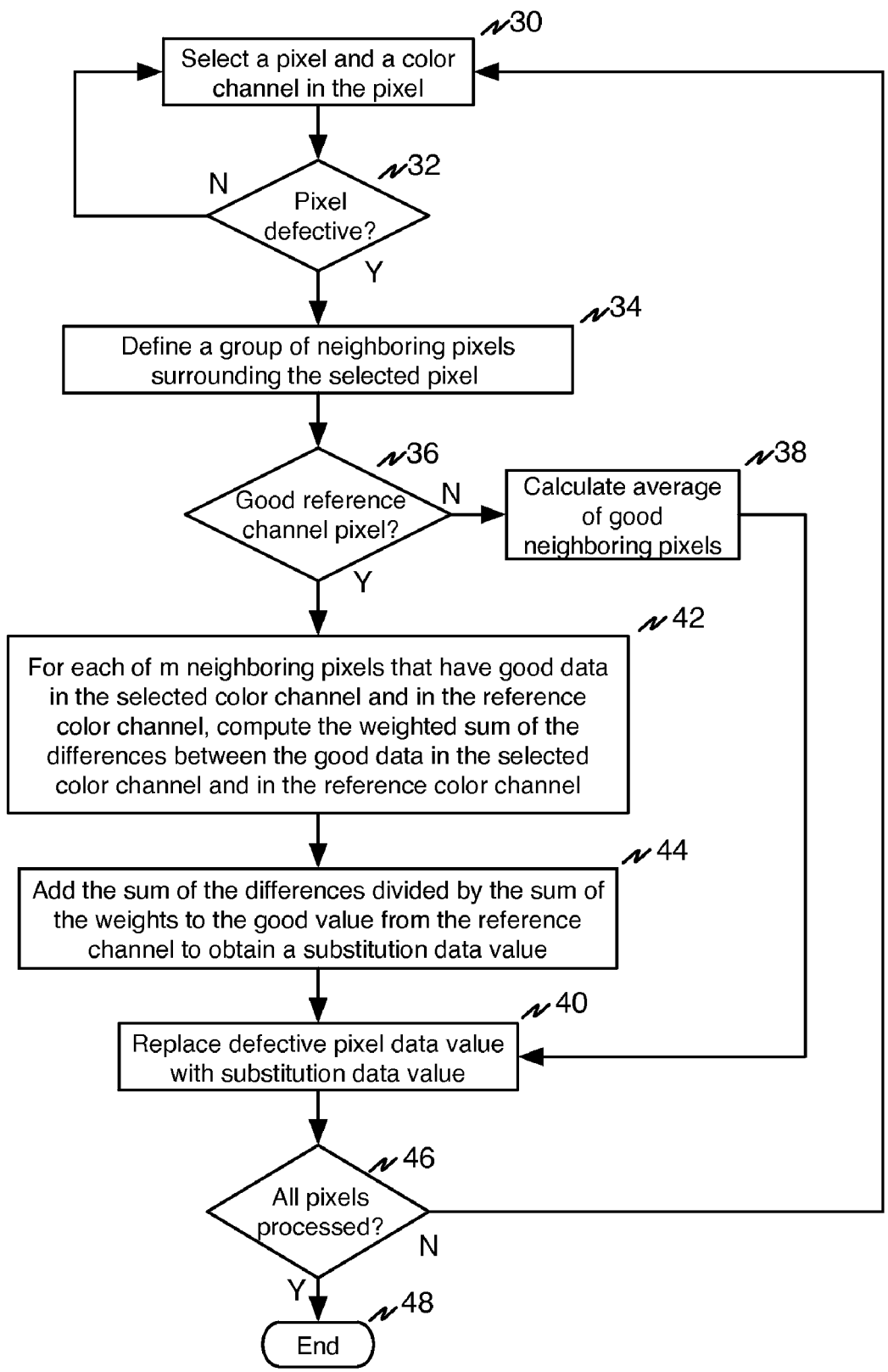
FIG. 4 is a flow diagram illustrating another exemplary method for defective pixel correction in accordance with the present invention.

Referring now to FIG. 4, a flow diagram illustrates another exemplary method for defective pixel correction in accordance with the present invention. First, at reference numeral 30 a pixel and the data of one of the color channels in the pixel are selected. Next, at reference numeral 32, it is determined whether the selected pixel data in the selected color channel is defective. This may be done by examining the defective pixel map or list, or by other means known in the art.

At reference numeral 34, a group of neighboring pixels surrounding the selected pixel is defined. In a presently-preferred embodiment, this neighborhood may be defined as a 3×3 group of neighboring pixels with the selected pixel in the center. Persons of ordinary skill in the art will appreciate that the pixel neighborhood could be defined in other ways using a fewer or greater number of pixels surrounding the selected pixel.

At reference numeral 36 it is determined whether there is a reference color channel for the pixel containing good pixel data. For example, if the red color channel of the selected pixel is being processed, it is determined whether the data in either of the blue or green color channels is good data. If it is determined that there is no good reference channel pixel, the process proceeds to reference numeral 38, where a process, such as calculating the average value of the good pixels in the selected color channel defined neighborhood, is performed to generate substitute data for the defective pixel. The process proceeds to reference numeral 40 where the generated substitute data is used to replace the defective pixel data.

If, at reference numeral 36, it is determined that there is a reference color channel in the selected pixel having good data, the process proceeds to reference numeral 42, where data in the selected color channel and the reference color channel from all of the available neighboring pixels (i.e., only pixels with good data) is processed to compute the weighted sum of the differences between the good data in the selected color channel and the data in the reference color channel. In general, there will be an integer m equal to the number of neighboring pixels that have good data in both the selected color channel and the reference color channel. At reference numeral 44, the weighted sum of the differences divided by the sum of weights is added to the good data value from the reference color channel of the selected pixel to obtain a data substitution value.

As will be appreciated by persons of ordinary skill in the art, various weighting factors may be employed in accordance with the instant invention. As non-limiting examples, weighting factor $w_i$ may be calculated as:

$$w_i = 1/(|P5 - Pi| + K) \quad (12)$$

As another non-limiting example, weighting factor $w_i$ may be calculated as:

$$w_i = \exp[-|P5-Pi|^2/K] \quad (13)$$

In these examples, K denotes a predetermined constant or scaling factor. The terms P5 an Pi can denote the available data in the reference color channel, for example.

Next, at reference numeral 40, the defective pixel data value is replaced with the substitution data value. At reference numeral 46, it is determined whether all pixels have been processed. If all pixels have been processed, the process ends at reference numeral 48. If all pixels have not yet been processed, the process returns to reference numeral 30, where another pixel is selected for review.

Figure 5:
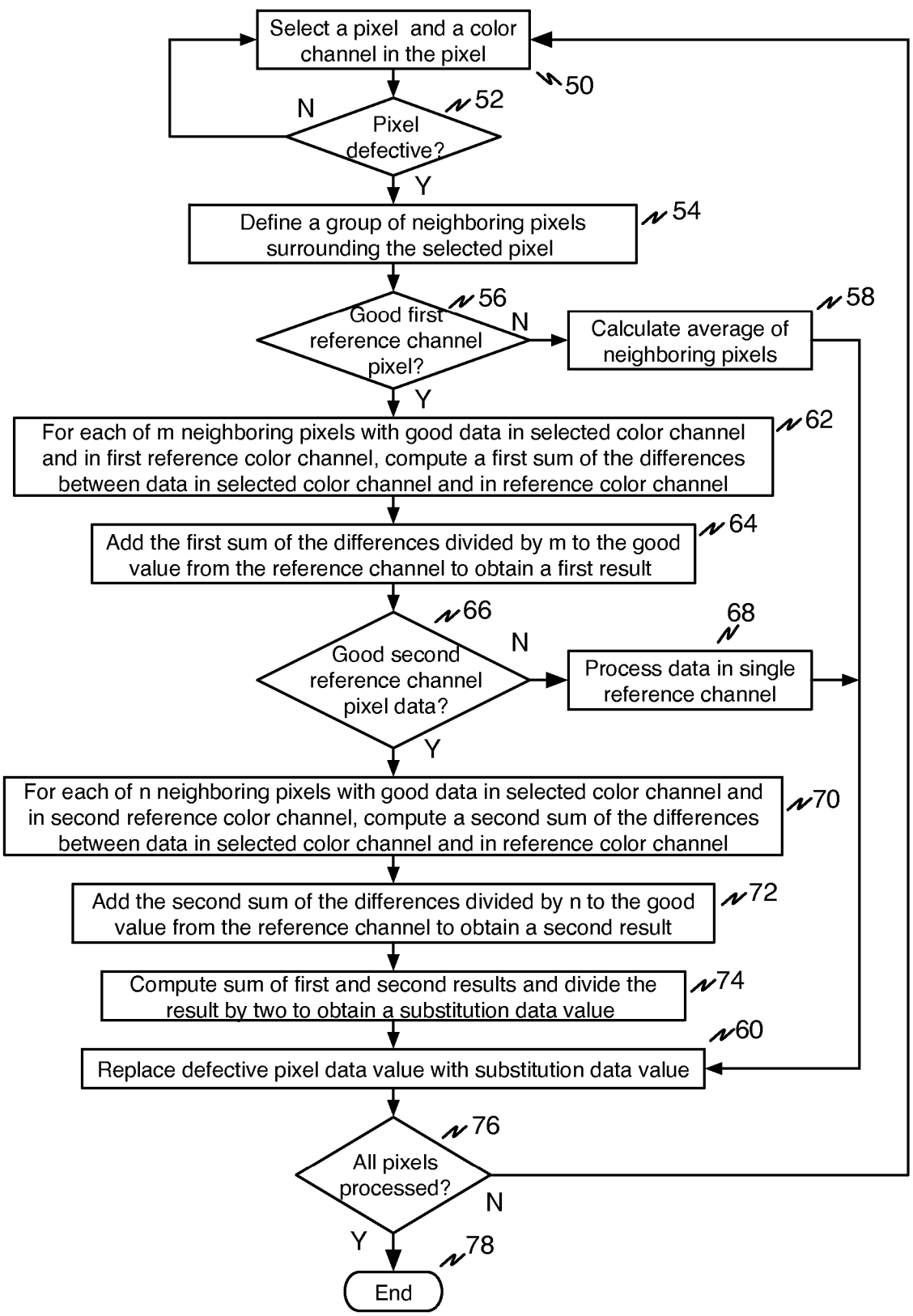
FIG. 5 is a flow diagram illustrating another exemplary method for defective pixel correction in accordance with the present invention.

Referring now to FIG. 5, a flow diagram illustrates another exemplary method for defective pixel correction in accordance with the present invention. In the example of FIG. 5, data from two reference color channels is used if the data is available.

First, at reference numeral 50 a pixel and the data of one of the color channels in the pixel are selected. Next, at reference numeral 52, it is determined whether the selected pixel data in the selected color channel is defective. This may be done by examining the defective pixel map or list, or by other means known in the art.

At reference numeral 54, a group of neighboring pixels surrounding the selected pixel is defined. In a presently-preferred embodiment, this neighborhood may be defined as a 3×3 group of neighboring pixels with the selected pixel in the center. Persons of ordinary skill in the art will appreciate that the pixel neighborhood could be defined in other ways using a fewer or greater number of pixels surrounding the selected pixel.

At reference numeral 56 it is determined whether there is a first reference color channel for the pixel containing good pixel data. For example, if the red color channel of the selected pixel is being processed, it is determined whether the data in either of the blue or green color channels is good data. If it is determined that there is no good reference channel pixel, the process proceeds to reference numeral 58, where a process, such as calculating the average value of the good pixels in the selected color channel defined neighborhood, is performed to generate substitute data for the defective pixel. The process proceeds to reference numeral 60 where the generated substitute data is used to replace the defective pixel data.

If, at reference numeral 56, it is determined that there is a first reference color channel in the selected pixel having good data, the process proceeds to reference numeral 62, where data in the selected color channel and the first reference color channel from all of the available neighboring pixels (i.e., only pixels with good data) is processed to compute the sum of the differences between the good data in the selected color channel and the data in the first reference color channel. In general, there will be an integer m equal to the number of neighboring pixels that have good data in both the selected color channel and the first reference color channel. At reference numeral 64, the sum of the differences divided by m is added to the good data value from the reference color channel of the selected pixel to obtain a first result.

Next, at reference numeral 66, it is determined whether there is a second reference color channel for the pixel containing good pixel data. If it is determined that there is no good second reference color channel that contains good data for the selected pixel, the process proceeds to reference numeral 68, where the first result from reference numeral 64 is used as the substitute data for the defective pixel. The process proceeds to reference numeral 60 where the substitute data is used to replace the defective pixel data.

If, at reference numeral 66, it is determined that there is a second reference color channel for the pixel containing good pixel data, the process proceeds to reference numeral the process proceeds to reference numeral 70, where data in the selected color channel and the second reference color channel from all of the available neighboring pixels (i.e., only pixels with good data) is processed to compute the sum of the differences between the good data in the selected color channel and the data in the second reference color channel. In general, there will be an integer n equal to the number of neighboring pixels that have good data in both the selected color channel and the first reference color channel. At reference numeral 72, the sum of the differences divided by n is added to the good data value from the reference color channel of the selected pixel to obtain a second result.

At reference numeral 74, the sum of the first and second results is computed. The sum is then divided by two to obtain a substitution data value. Next, at reference numeral 60, the defective pixel data value is replaced with the substitution data value generated at reference numeral 74.

Finally, at reference numeral 76, it is determined whether all pixels have been processed. If all pixels have been processed, the process ends at reference numeral 78. If all pixels have not yet been processed, the process returns to reference numeral 50, where another pixel is selected for review.

According to another aspect of the present invention illustrated with reference to FIGS. 6, 7, and 8, either a sum or a weighted sum of color ratios of good neighboring pixels in the color channel containing the defective pixel and the good pixels in at least one other color channel is computed and used to provide the substitute value for the defective pixel.

Figure 6:
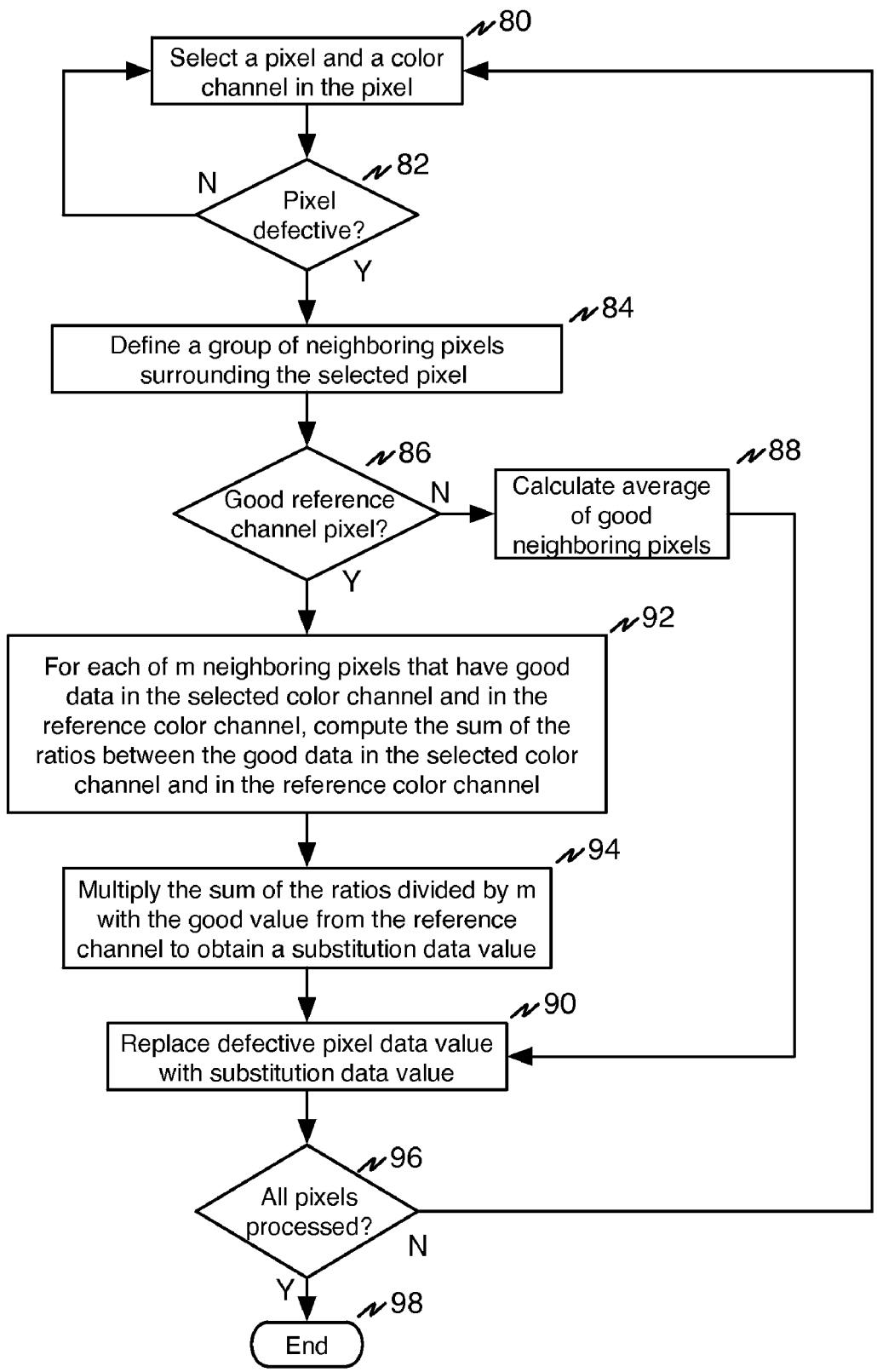
FIG. 6 is a flow diagram illustrating another exemplary method for defective pixel correction in accordance with the present invention.

Referring now to FIG. 6, a flow diagram illustrates the above-described exemplary method for defective pixel correction in accordance with the present invention. First, at reference numeral 80 a pixel and the data of one of the color channels in the pixel are selected. Next, at reference numeral 82, it is determined whether the selected pixel data in the selected color channel is defective. This may be done by examining the defective pixel map or list, or by other means known in the art.

At reference numeral 84, a group of neighboring pixels surrounding the selected pixel is defined. In a presently-preferred embodiment, this neighborhood may be defined as a 3×3 group of neighboring pixels with the selected pixel in the center. Persons of ordinary skill in the art will appreciate that the pixel neighborhood could be defined in other ways using a fewer or greater number of pixels surrounding the selected pixel. Such skilled persons will also appreciate that for pixels located at the edges of an image, there will not be adjacent available pixels to one side (either top, bottom, left, or right) or in the corner of the image to even two sides (either top-left, top-right, bottom-left, or bottom right) of the selected pixel that can be used for correction. In such cases, the methods of the present invention can be implemented using the data available from the existing adjacent pixels or the edge pixels can be ignored.

At reference numeral 86 it is determined whether there is a reference color channel for the pixel containing good pixel data. For example, if the red color channel of the selected pixel is being processed, it is determined whether the data in either of the blue or green color channels is good data. If it is determined that there is no good reference channel pixel, the process proceeds to reference numeral 88, where a process, such as calculating the average value of the good pixels in the selected color channel defined neighborhood, is performed to generate substitute data for the defective pixel. The process proceeds to reference numeral 90 where the generated substitute data is used to replace the defective pixel data.

If, at reference numeral 86, it is determined that there is a reference color channel in the selected pixel having good data, the process proceeds to reference numeral 92, where data in the selected color channel and the reference color channel from all of the available neighboring pixels (i.e., only pixels with good data) is processed to compute the sum of the ratios between the good data in the selected color channel and the data in the reference color channel. In general, there will be an integer m equal to the number of neighboring pixels that have good data in both the selected color channel and the reference color channel. At reference numeral 94, the sum of the ratios divided by m is multiplied with the good data value from the reference color channel of the selected pixel to obtain a data substitution value.

Next, at reference numeral 90, the defective pixel data value is replaced with the substitution data value. At reference numeral 96, it is determined whether all pixels have been processed. If all pixels have been processed, the process ends at reference numeral 98. If all pixels have not yet been processed, the process returns to reference numeral 80, where another pixel is selected for review.

Figure 7:
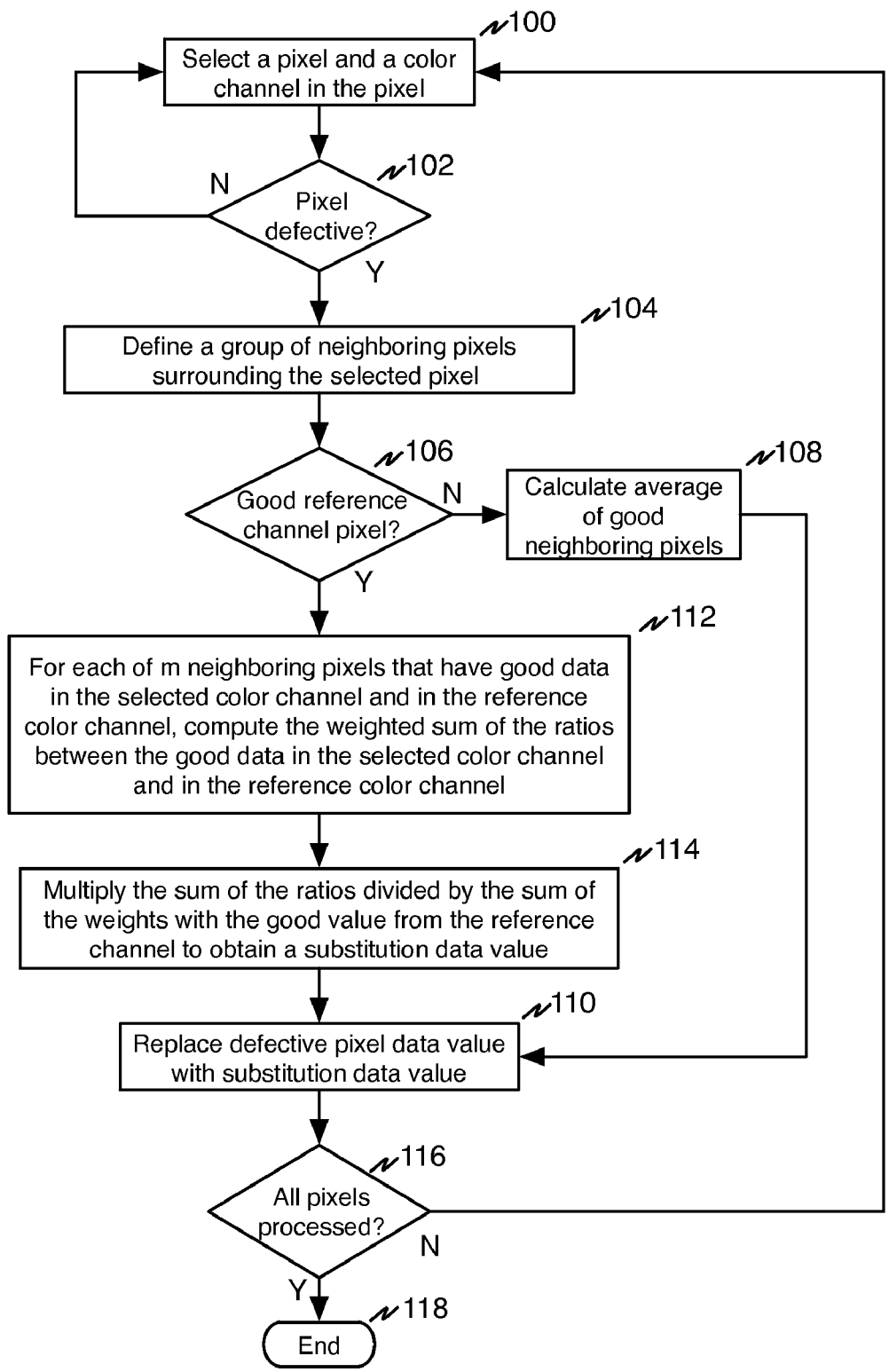
FIG. 7 is a flow diagram illustrating another exemplary method for defective pixel correction in accordance with the present invention.

Referring now to FIG. 7, a flow diagram illustrates another exemplary method for defective pixel correction in accordance with the present invention. First, at reference numeral 100 a pixel and the data of one of the color channels in the pixel are selected. Next, at reference numeral 102, it is determined whether the selected pixel data in the selected color channel is defective. This may be done by examining the defective pixel map or list, or by other means known in the art.

At reference numeral 104, a group of neighboring pixels surrounding the selected pixel is defined. In a presently-preferred embodiment, this neighborhood may be defined as a 3×3 group of neighboring pixels with the selected pixel in the center. Persons of ordinary skill in the art will appreciate that the pixel neighborhood could be defined in other ways using a fewer or greater number of pixels surrounding the selected pixel.

At reference numeral 106 it is determined whether there is a reference color channel for the pixel containing good pixel data. For example, if the red color channel of the selected pixel is being processed, it is determined whether the data in either of the blue or green color channels is good data. If it is determined that there is no good reference channel pixel, the process proceeds to reference numeral 108, where a process, such as calculating the average value of the good pixels in the selected color channel defined neighborhood, is performed to generate substitute data for the defective pixel. The process proceeds to reference numeral 110 where the generated substitute data is used to replace the defective pixel data.

If, at reference numeral 106, it is determined that there is a reference color channel in the selected pixel having good data, the process proceeds to reference numeral 112, where data in the selected color channel and the reference color channel from all of the available neighboring pixels (i.e., only pixels with good data) is processed to compute the weighted sum of the ratios between the good data in the selected color channel and the data in the reference color channel. In general, there will be an integer m equal to the number of neighboring pixels that have good data in both the selected color channel and the reference color channel. At reference numeral 114, the weighted sum of the ratios divided by the sum of weights is multiplied with the good data value from the reference color channel of the selected pixel to obtain a data substitution value.

As will be appreciated by persons of ordinary skill in the art, various weighting factors may also be employed in accordance with this aspect of the instant invention. As non-limiting examples, weighting factor $w_i$ may be calculated as in Equation (12) or Equation (13).

Next, at reference numeral 110, the defective pixel data value is replaced with the substitution data value. At reference numeral 116, it is determined whether all pixels have been processed. If all pixels have been processed, the process ends at reference numeral 118. If all pixels have not yet been processed, the process returns to reference numeral 110, where another pixel is selected for review.

Figure 8:
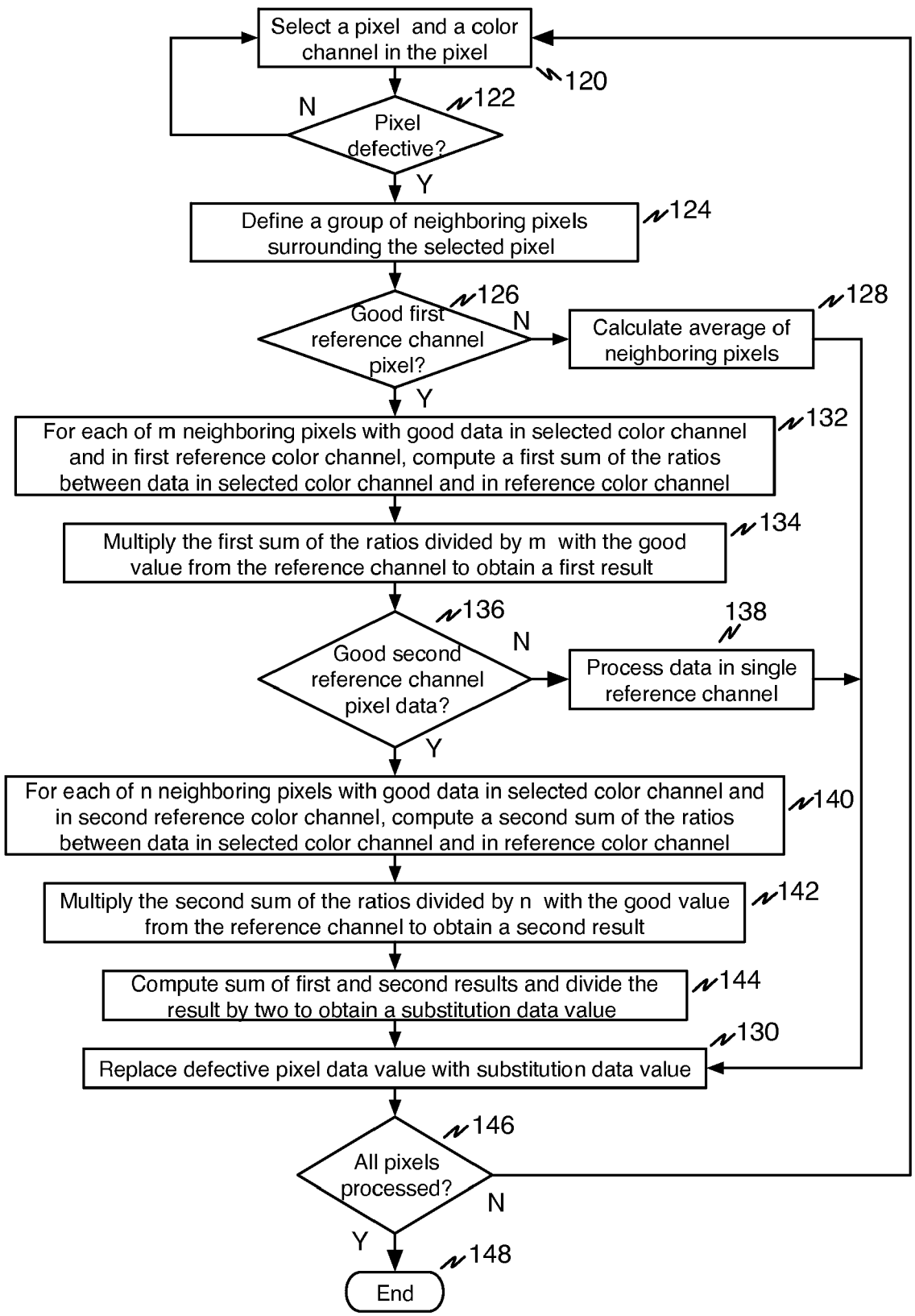
FIG. 8 is a flow diagram illustrating another exemplary method for defective pixel correction in accordance with the present invention.

Referring now to FIG. 8, a flow diagram illustrates another exemplary method for defective pixel correction in accordance with the present invention. As in the example of FIG. 5, data from two reference color channels is used in the example of FIG. 8 if the data is available.

First, at reference numeral 120 a pixel and the data of one of the color channels in the pixel are selected. Next, at reference numeral 122, it is determined whether the selected pixel data in the selected color channel is defective. This may be done by examining the defective pixel map or list, or by other means known in the art.

At reference numeral 124, a group of neighboring pixels surrounding the selected pixel is defined. In a presently-preferred embodiment, this neighborhood may be defined as a 3×3 group of neighboring pixels with the selected pixel in the center. Persons of ordinary skill in the art will appreciate that the pixel neighborhood could be defined in other ways using a fewer or greater number of pixels surrounding the selected pixel.

At reference numeral 126 it is determined whether there is a first reference color channel for the pixel containing good pixel data. For example, if the red color channel of the selected pixel is being processed, it is determined whether the data in either of the blue or green color channels is good data. If it is determined that there is no good reference channel pixel, the process proceeds to reference numeral 128, where a process, such as calculating the average value of the good pixels in the selected color channel defined neighborhood, is performed to generate substitute data for the defective pixel. The process proceeds to reference numeral 130 where the generated substitute data is used to replace the defective pixel data.

If, at reference numeral 126, it is determined that there is a first reference color channel in the selected pixel having good data, the process proceeds to reference numeral 132, where data in the selected color channel and the first reference color channel from all of the available neighboring pixels (i.e., only pixels with good data) is processed to compute the sum of the ratios between the good data in the selected color channel and the data in the first reference color channel. In general, there will be an integer m equal to the number of neighboring pixels that have good data in both the selected color channel and the first reference color channel. At reference numeral 134, the sum of the ratios divided by m is multiplied with the good data value from the reference color channel of the selected pixel to obtain a first result.

Next, at reference numeral 136, it is determined whether there is a second reference color channel for the pixel containing good pixel data. If it is determined that there is no good second reference color channel that contains good data for the selected pixel, the process proceeds to reference numeral 138, where the first result from reference numeral 134 is used as the substitute data for the defective pixel. The process proceeds to reference numeral 130 where the substitute data is used to replace the defective pixel data.

If, at reference numeral 136, it is determined that there is a second reference color channel for the pixel containing good pixel data, the process proceeds to reference numeral 140, where data in the selected color channel and the second reference color channel from all of the available neighboring pixels (i.e., only pixels with good data) is processed to compute the sum of the ratios between the good data in the selected color channel and the data in the second reference color channel. In general, there will be an integer n equal to the number of neighboring pixels that have good data in both the selected color channel and the first reference color channel. At reference numeral 142, the sum of the ratios divided by n is multiplied with the good data value from the reference color channel of the selected pixel to obtain a second result.

At reference numeral 144, the sum of the first and second results is computed. The sum is then divided by two to obtain a substitution data value. Next, at reference numeral 130, the defective pixel data value is replaced with the substitution data value generated at reference numeral 144.

Finally, at reference numeral 146, it is determined whether all pixels have been processed. If all pixels have been processed, the process ends at reference numeral 148. If all pixels have not yet been processed, the process returns to reference numeral 120, where another pixel is selected for review.

While embodiments and applications of this invention have been shown and described, it would be apparent to those skilled in the art that many more modifications than mentioned above are possible without departing from the inventive concepts herein. The invention, therefore, is not to be restricted except in the spirit of the appended claims.

What is claimed is:

1. A method for replacing defective pixels in a digital color image, each pixel including data in at least two color channels, the method comprising:
   determining whether each pixel has defective data in a selected color channel and, if so, selecting that pixel;
   for the selected pixel, determining whether a first reference color channel characterized by having non-defective data exists;
   for each selected pixel having the first reference color channel characterized by having non-defective data, correcting the defective data by:
      defining a group of neighboring pixels surrounding the selected pixel;
      for each of m neighboring pixels in the group that have both non-defective data in the selected color channel and non-defective data in the reference color channel, computing a sum of the differences between the non-defective data in the selected color channel and the non-defective data in the first reference color channel;
      adding the sum of the differences divided by m to the non-defective data value from the first reference color channel to obtain a substitution data value; and
   substituting the substitution data value for the defective data.

2. The method of claim 1 wherein defining a group of neighboring pixels surrounding the selected pixel comprises defining a group of nine neighboring pixels.

3. A method for replacing defective pixels in a digital color image, each pixel including data in at least two color channels, the method comprising:
   determining whether each pixel has defective data in a selected color channel and, if so, selecting that pixel;
   for the selected pixel, determining whether a first reference color channel characterized by having non-defective data exists;
   for each selected pixel having the first reference color channel characterized by having non-defective data, correcting the defective data by:
      defining a group of neighboring pixels surrounding the selected pixel;
      for each of m neighboring pixels in the group that have both non-defective data in the selected color channel and non-defective data in the reference color channel, computing a weighted sum of the differences between the non-defective data in the selected color channel and the non-defective data in the first reference color channel;
      adding the weighted sum of the differences divided by the sum of weights to the non-defective data substitution data value from the first reference color channel to obtain a result; and
   substituting the substitution data value for the defective data.

4. The method of claim 3 wherein defining a group of neighboring pixels surrounding the selected pixel comprises defining a group of nine neighboring pixels.

5. A method for replacing defective pixels in a digital color image, each pixel including data in three color channels, the method comprising:
   determining whether each pixel has defective data in a selected color channel and, if so, selecting that pixel;
   for the selected pixel, determining whether a first reference color channel characterized by having non-defective data exists;
   for each selected pixel having the first reference color channel characterized by having non-defective data, correcting the defective data by:
      defining a group of neighboring pixels surrounding the selected pixel;
      for each of m neighboring pixels in the group that have both non-defective data in the selected color channel and non-defective data in the first reference color channel, computing a first sum of the differences between the non-defective data in the selected channel and the non-defective data in the first reference color channel;
      adding the first sum of the differences divided by m to the non-defective data value from the first reference color channel to obtain a first result;
   for the selected pixel, determining whether a second reference color channel characterized by having non-defective data exists;
      if the second reference channel characterized by having non-defective data exists, for each of n neighboring pixels in the group that have both non-defective data in the selected color channel and non-defective data in the second reference color channel, computing a second sum of the differences between the non-defective data in the selected channel and the non-defective data in the second reference color channel;
      adding the second sum of the differences divided by n to the non-defective data value from the second reference color channel to obtain a second result;
   computing the sum of the first result and the second result and dividing the sum of the first result and the second result by two to obtain a substitution data value; and
   substituting the substitution data value for the defective data.

6. The method of claim 5 wherein defining a group of neighboring pixels surrounding the selected pixel comprises defining a group of nine neighboring pixels.

7. A method for replacing defective pixels in a digital color image, each pixel including data in three color channels, the method comprising:
- determining whether each pixel has defective data in a selected color channel and, if so, selecting that pixel;
- for the selected pixel, determining whether a first reference color channel characterized by having non-defective data exists;
- for each selected pixel having the first reference color channel characterized by having non-defective data exists, correcting the defective data by:
  - defining a group of neighboring pixels surrounding the selected pixel;
  - for each of m neighboring pixels in the group that have both non-defective data in the selected color channel and non-defective data in the first reference color channel, computing a first weighted sum of the differences between the non-defective data in the selected channel and the non-defective data in the first reference color channel;
  - adding the first weighted sum of the differences divided by the sum of weights to the non-defective data value from the first reference color channel to obtain a first result;
- for the selected pixel, determining whether a second reference color channel characterized by having non-defective data exists;
  - if the second reference channel characterized by having non-defective data exists, for each of n neighboring pixels in the group that have both non-defective data in the selected color channel and non-defective data in the second reference color channel, computing a second weighted sum of the differences between the non-defective data in the selected channel and the non-defective data in the second reference color channel;
  - adding the second weighted sum of the differences divided by the sum of weights to the non-defective data value from the second reference color channel to obtain a second result;
- computing the sum of the first result multiplied by the first weight and the second result multiplied by the second weight and dividing sum of the first result multiplied by the first weight and the second result multiplied by the second weight by the sum of the first weight and the second weight to obtain a substitution data value; and
- substituting the substitution data value for the defective data.

8. The method of claim 7 wherein defining a group of neighboring pixels surrounding the selected pixel comprises defining a group of nine neighboring pixels.

9. The method of claim 7 wherein the first weight used to calculate the first weighted sum is different from the second weight used to calculate the second weighed sum.

10. A method for replacing defective pixels in a digital color image, each pixel including data in at least two color channels, the method comprising:
- determining whether each pixel has defective data in a selected color channel and, if so, selecting that pixel;
- for the selected pixel, determining whether a first reference color channel characterized by having non-defective data exists;
- for each selected pixel having the first reference color channel characterized by having non-defective data, correcting the defective data by:
  - defining a group of neighboring pixels surrounding the selected pixel;
  - for each of m neighboring pixels in the group that have both non-defective data in the selected color channel and non-defective data in the reference color channel, computing a sum of the ratios between the non-defective data in the selected color channel and the non-defective data in the first reference color channel;
  - multiplying the sum of the ratios divided by m with the non-defective data substitution data value from the first reference color channel to obtain a result; and
- substituting the substitution data value for the defective data.

11. The method of claim 10 wherein defining a group of neighboring pixels surrounding the selected pixel comprises defining a group of nine neighboring pixels.

12. A method for replacing defective pixels in a digital color image, each pixel including data in at least two color channels, the method comprising:
- determining whether each pixel has defective data in a selected color channel and, if so, selecting that pixel;
- for the selected pixel, determining whether a first reference color channel characterized by having non-defective data exists;
- for each selected pixel having the first reference color channel characterized by having non-defective data, correcting the defective data by:
  - defining a group of neighboring pixels surrounding the selected pixel;
  - for each of m neighboring pixels in the group that have both non-defective data in the selected color channel and non-defective data in the reference color channel, computing a weighted sum of the ratios between the non-defective data in the selected color channel and the non-defective data in the first reference color channel;
  - multiplying the weighted sum of the ratios divided by the sum of weights with the non-defective data substitution data value from the first reference color channel to obtain a result; and
- substituting the substitution data value for the defective data.

13. The method of claim 12 wherein defining a group of neighboring pixels surrounding the selected pixel comprises defining a group of nine neighboring pixels.

14. A method for replacing defective pixels in a digital color image, each pixel including data in three color channels, the method comprising:
- determining whether each pixel has defective data in a selected color channel and, if so, selecting that pixel;
- for the selected pixel, determining whether a first reference color channel characterized by having non-defective data exists;
- for each selected pixel having the first reference color channel characterized by having non-defective data, correcting the defective data by:
  - defining a group of neighboring pixels surrounding the selected pixel;
  - for each of m neighboring pixels in the group that have both non-defective data in the selected color channel and non-defective data in the first reference color channel, computing a first sum of the ratios between the non-defective data in the selected channel and the non-defective data in the first reference color channel;
  - multiplying the first sum of the ratios divided by m with the non-defective data value from the first reference color channel to obtain a first result;

for the selected pixel, determining whether a second reference color channel characterized by having non-defective data exists;
    if the second reference channel characterized by having non-defective data exists, for each of n neighboring pixels in the group that have both non-defective data in the selected color channel and non-defective data in the second reference color channel, computing a second sum of the ratios between the non-defective data in the selected channel and the non-defective data in the second reference color channel;
    multiplying the second sum of the ratios divided by n with the non-defective data value from the second reference color channel to obtain a second result;
computing the sum of the first result and the second result and dividing the sum of the first result and the second result by two to obtain a substitution data value; and
substituting the substitution data value for the defective data.

15. The method of claim 14 wherein defining a group of neighboring pixels surrounding the selected pixel comprises defining a group of nine neighboring pixels.

16. A method for replacing defective pixels in a digital color image, each pixel including data in three color channels, the method comprising:
    determining whether each pixel has defective data in a selected color channel and, if so, selecting that pixel;
    for the selected pixel, determining whether a first reference color channel characterized by having non-defective data exists;
    for each selected pixel having the first reference color channel characterized by having non-defective data exists, correcting the defective data by:
        defining a group of neighboring pixels surrounding the selected pixel;
        for each of m neighboring pixels in the group that have both non-defective data in the selected color channel and non-defective data in the first reference color channel, computing a first weighted sum of the ratios between the non-defective data in the selected channel and the non-defective data in the first reference color channel;
    multiplying the first weighted sum of the ratios divided by a weighting factor with the non-defective data value from the first reference color channel to obtain a first result;
for the selected pixel, determining whether a second reference color channel characterized by having non-defective data exists;
    if the second reference channel characterized by having non-defective data exists, for each of n neighboring pixels in the group that have both non-defective data in the selected color channel and non-defective data in the second reference color channel, computing a second weighted sum of the ratios between the non-defective data in the selected channel and the non-defective data in the second reference color channel;
    multiplying the second weighted sum of the ratios divided by the sum of weights with the non-defective data value from the second reference color channel to obtain a second result;
computing the sum of the first result multiplied by the first weight and the second result multiplied by the second weight and dividing sum of the first result multiplied by the first weight and the second result multiplied by the second weight by the sum of the first weight and the second weight to obtain a substitution data value; and
substituting the substitution data value for the defective data.

17. The method of claim 16 wherein defining a group of neighboring pixels surrounding the selected pixel comprises defining a group of nine neighboring pixels.

18. The method of claim 16 wherein the first weight used to calculate the first weighted sum is different from the second weight used to calculate the second weighed sum.

* * * * *